(12) United States Patent
Brettes et al.

(10) Patent No.: US 8,156,742 B2
(45) Date of Patent: Apr. 17, 2012

(54) FUEL-INJECTION DEVICE IN A TURBOMACHINE

(75) Inventors: Frédéric Brettes, Boissise le Roi (FR); Jean Charles Cappellari, Hericy (FR); Laurent Gilbert Yves Hodinot, Cesson (FR); Sandrine Huet, Corbeil-Essonnes (FR)

(73) Assignee: SNECMA, Paris (FR)

( * ) Notice: Subject to any disclaimer, the term of this patent is extended or adjusted under 35 U.S.C. 154(b) by 987 days.

(21) Appl. No.: 12/016,624

(22) Filed: Jan. 18, 2008

(65) Prior Publication Data

US 2008/0178596 A1 Jul. 31, 2008

(30) Foreign Application Priority Data

Jan. 19, 2007 (FR) ...................................... 07 00386

(51) Int. Cl.
*F02C 7/22* (2006.01)
*F02C 7/232* (2006.01)

(52) U.S. Cl. ..................... 60/740; 137/110; 137/115.13; 137/115.17; 137/458; 60/734; 60/39.281; 251/30.02

(58) Field of Classification Search .................... 60/734, 60/740, 39.281; 123/198 DB, 363, 375, 378, 123/379; 137/110, 115.13, 115.17, 115.28, 137/ 458, 87.04; 251/30.02

See application file for complete search history.

(56) References Cited

U.S. PATENT DOCUMENTS

| | | | | |
|---|---|---|---|---|
| 5,020,315 | A * | 6/1991 | Leachman et al. | 60/39.281 |
| 5,501,245 | A * | 3/1996 | Lechevalier | 137/115.06 |
| 6,328,056 | B1 * | 12/2001 | Kumar et al. | 137/115.09 |
| 2006/0021324 | A1 | 2/2006 | Eick et al. | |

FOREIGN PATENT DOCUMENTS

| | | |
|---|---|---|
| EP | 1 557 546 A1 | 7/2005 |
| FR | 2 818 690 A1 | 6/2002 |

* cited by examiner

*Primary Examiner* — William H Rodriguez
*Assistant Examiner* — Steven Sutherland
(74) *Attorney, Agent, or Firm* — Oblon, Spivak, McClelland, Maier & Neustadt, L.L.P.

(57) ABSTRACT

A fuel-injection device in a turbomachine is disclosed. The device includes a high-pressure pump supplying a flow control valve, whose outlet is connected via a pressurization and cut-off valve to a fuel-injector feed pipe. The valve is connected to the inlet and to the outlet of the pump in order to define two fuel pressurization thresholds, one of which is used to start-up and restart the turbomachine and the other is used for operating the turbomachine from an idle speed and for commanding an equipment with variable geometry.

12 Claims, 2 Drawing Sheets

FUEL-INJECTION DEVICE IN A TURBOMACHINE

The invention relates to a fuel injection device for a turbomachine, such as an aeroplane turboreactor or turbopropeller.

Generally-speaking, this device comprises at least one high-pressure pump driven by the turbine of the turbomachine and whose inlet is connected to a fuel tank, with its outlet having piloted means of flow rate control, comprising a metering valve, and which are themselves connected, via a pressurization and cut-off means, sometimes referred to as a stop-valve, to fuel injectors located inside the combustion chamber of the turbomachine.

The pressurization and cut-off means comprise a piston that can be moved inside a cylindrical body between the open and closed position of a feed pipe for the fuel injectors, such piston being sensitive on the one hand to the fuel pressure at the outlet of the metering valve and on the other hand to a command pressure for the purpose of closing the injectors' feed pipe as long as the fuel pressure remains below a predetermined threshold.

During the normal operating of the turbomachine, the fuel-pressure difference between the outlet and the inlet of the pump is at an adequate value for the purpose of commanding the accessory equipment, notably comprising the variable pitch vanes (such equipment being referred to hereinafter as "variable geometry equipment"):

When a combustion incident occurs entailing engine stoppage, the engine is expected to start again whilst in the air, by way of the sole engine shaft rotation driven by the air current inside the turbomachine.

The restarting speed of the turbomachine under such conditions is much lower than the in-flight rotation speed or during normal restarting carried out on the ground by means of a start-up device. The high-pressure pump of the fuel injection device is driven at this low rotation speed and is unable to supply fuel with sufficient pressure in order to open the pressurization and cut-off means and to command the variable geometry equipment.

Various means have been proposed in the state of the art in order to solve this problem.

In the applicant's previous application, EP-A-1231368, a pressurization and cut-off means was proposed with two levels of pressurization depending on the rotation speed of the turbomachine, the low level corresponding to the idle engine speed and to the engine operating with a reduced fuel flow rate, the high level being able to guarantee operating with a high fuel flow rate. Such pressurization means is commanded by the metering valve of the flow rate control means through the intermediary of several diaphragms assembled in parallel between the high-pressure pump, the metering valve and the pressurization and cut-off means.

This known solution has the drawback of having a low pressurization level that is inadequate for commanding the variable geometry equipment. It also imposes modification of the metering valve and installation of these diaphragms, and thus has a significant cost. The present invention aims to solve this problem in a simple, efficient and low-cost manner, notably without transforming the metering valve.

It thus proposes a fuel injection device in a turbomachine, comprising at least one pump connecting a fuel tank to the flow rate control means supplying fuel injectors through the intermediary of a pressurization and cut-off valve, such valve comprising a piston that can be moved inside a cylindrical body between an open position and a closed position for injector supply, such piston being sensitive to the pressurization of the fuel for closing the injector supply as long as such pressurization is lower than a predetermined threshold, the pressurization and cut-off valve comprising means for applying a counter-pressure on the piston, as from the idle speed of the turbomachine, thereby aiming to increase the fuel pressure above a second predetermined pressurization threshold, such second threshold exceeding the first threshold and a minimal value for controlling equipment with variable geometry of the turbomachine.

Hence, according to the invention, the means which enable to impose a second fuel pressurization threshold are incorporated into the pressurization and cut-off valve and not into the flow rate control means.

The second pressurization threshold enables, as from the engine's idle speed, to satisfactorily command the variable geometry equipment, such as, for example, the variable pitch vanes.

The first pressurization threshold allows the engine to start up easily on the ground and to start the engine again when in flight under the sole effect of the engine shaft rotation driven by the air current inside the turbomachine.

According to another feature of the invention, the means for applying the counter-pressure comprise an orifice formed in the cylindrical body of the valve and through which passes pressure from the pump outlet, said orifice being sealed off by the piston in its closed injector supply position and being open again by moving the piston when the turbomachine is at idle speed.

The passage from the first threshold to the second pressurization threshold is determined by the course of the piston between its closed injector supply position and the opening of the orifice of the cylindrical body, that is in fact by the position of this orifice along the piston displacement axis.

The second pressurization threshold value is, on its part, determined by the diameter of this orifice. The transition speed between the first and second pressurization threshold can be determined by the shape of this orifice.

For example, the orifice formed in the body of the valve comprises a cylindrical passage whose diameter determines the value of the second pressurization threshold, such cylindrical passage opening into an annular groove of the internal cylindrical surface of the valve body, such groove having an axial dimension or a dimension along the movement axis of the piston which exceeds the diameter of the aforementioned cylindrical passage and being adapted to communicate with an annular groove of the piston in which are formed radial orifices which open inside the piston.

Such configuration enables to considerably increase the transition speed between the first and second pressurization threshold and thus to very quickly have, at idle engine speed, adequate fuel pressure for commanding the variable geometry equipment of the turbomachine.

The invention will be better understood and its other characteristics, details and advantages will appear clearer upon reading the following description, drawn up, as an example, by referring to the drawings attached hereto, in which:

FIG. 1 schematically represents a fuel-injection device according to the invention;

Figure 1:
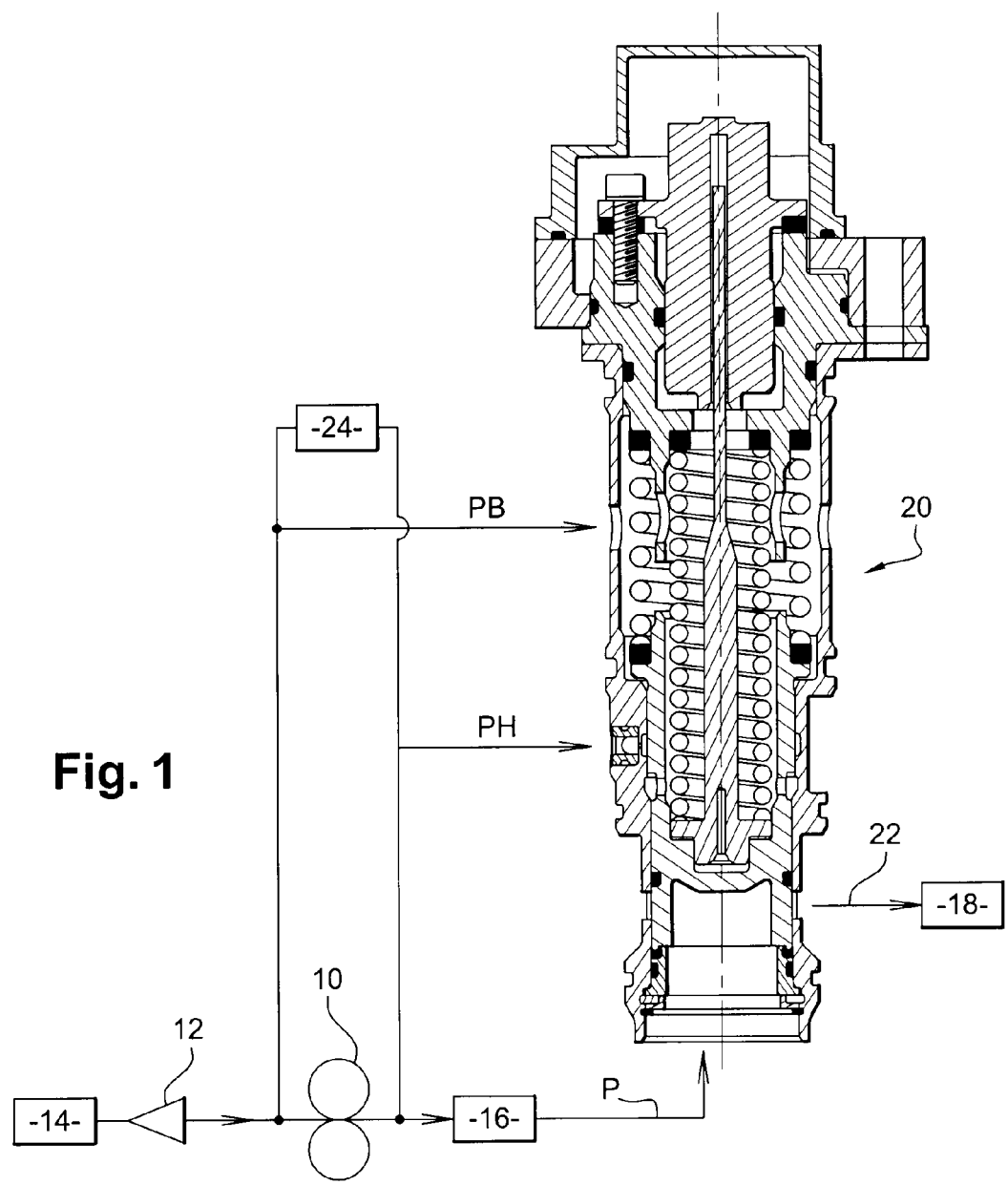

The fuel injection device, schematically represented in FIG. 1, essentially comprises a high-pressure pump 10 whose inlet is connected by a low-pressure pump 12 and by filters to a fuel tank 14 and whose outlet is connected to a flow rate control means 16 (FMV or Fuel Metering Valve) of a standard type enabling to regulate the fuel quantity sent to the injectors 18 in accordance with the turbomachine operating conditions.

A pressurization and cut-off valve 20 is mounted between the outlet of the flow control means 16 and a feed pipe 22 for the injectors 18, such valve 20, also referred to as a stop-valve, being sensitive to the fuel pressure P at the outlet of the flow control means 16 and preventing fuel supply to the injectors 18 as long as such pressure P has not reached a certain value, i.e. that the pressurization of the fuel is below a first threshold, such pressurization corresponding to the pressure difference between the outlet and inlet of the pump 10.

Such threshold is determined in order to enable the turbomachine to start-up again when the engine shaft is only driven into rotation by the air circulating inside the turbomachine.

Such pressurization threshold, which is relatively low (for example, approximately 19 bars), makes start-up of the turbomachine easier when on the ground by means of a start-up device, for example using compressed air.

According to the invention, the pressurization and cut-off valve 20 is designed to define a second pressurization threshold, higher than the first threshold, and which must be reached or exceeded as soon as a start-up or a restarting phase of the turbomachine is completed, such second pressurization threshold having an approximate value of, for example, 30 bars and being sufficiently high to make adequate fuel pressurization, i.e. the PH-PB pressure difference between the outlet and the inlet of pump 10, for easily commanding a group 24 of auxiliary variable geometry equipment, notably comprising variable pitch vanes.

Figure 2:
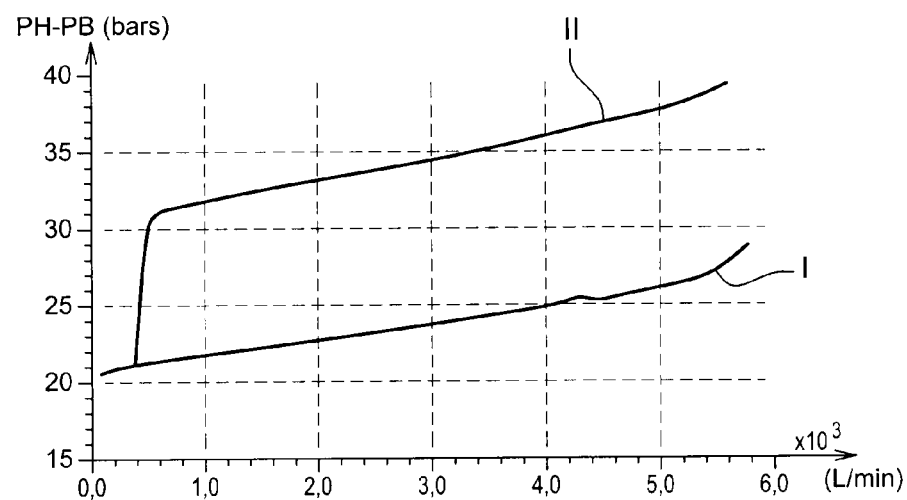
FIG. 2 is a graph showing the variations of a fuel pressure differential in accordance with the injected flow rate.

The diagram in FIG. 2 represents the PH-PB pressure difference variation in accordance with the fuel output supplied to the injectors 18, the curve I representing such variation when the pressurization and cut-off valve only define one pressurization threshold, and the curve II representing such variation in the case of a valve 20 according to the invention, which defines two pressurization thresholds as indicated above.

One can see in this diagram that in the device according to the invention, the transition between the first and the second pressurization threshold is performed very quickly for a precise injected fuel flow rate, which is relatively very low and which is reached as soon as the start-up or the restarting phases are completed. Hence, when the turbomachine is at idle speed, the PH-PB difference exceeds 30 bars and is quite adequate for commanding the variable geometry equipment.

Figure 3:
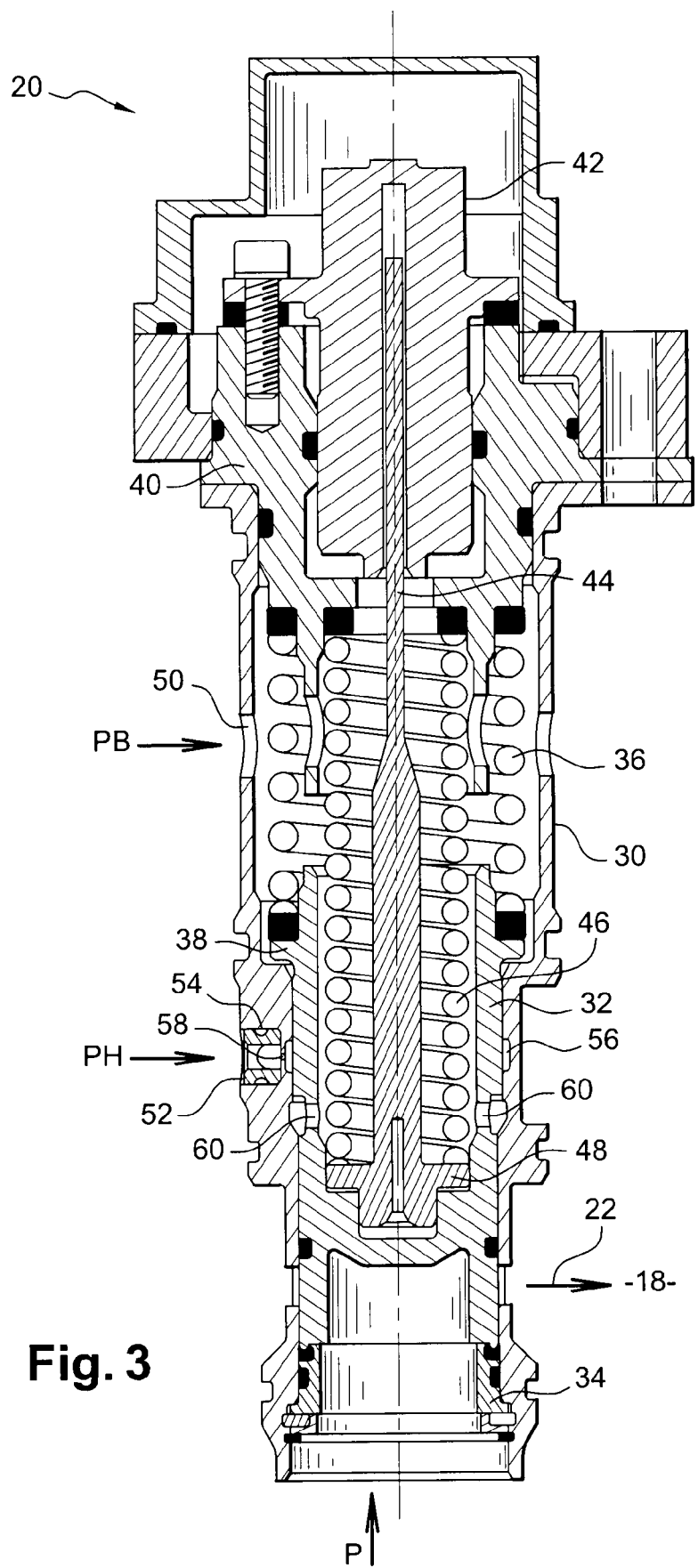
FIG. 3 is a schematic axial sectional view of the pressurization and cut-off valve of the device according to the invention.

Referring to FIG. 3, the features of the pressurization and cut-off valve 20 which enables to define these two fuel pressurization thresholds, will be now disclosed.

Such valve, which is shown in a vertical position in FIGS. 1 and 3, essentially comprises a cylindrical body 30 whose open lower end is connected to the outlet of the flow rate control means 16, and a piston 32 sealingly guided inside the body 30 between a lower position, represented in FIG. 3, closing the injectors' 18 feed pipe 22, and an upper position into which such feed pipe is opened.

The lower position of the piston 32 is defined by a seat 34 mounted securely inside the open lower end of the body 30.

The piston 32 is permanently biased to its lower position against the seat 34 by a spring 36 mounted around the piston and bearing on its ends on an external edge 38 of the upper part of the piston 32 and on a seat 40 securely mounted on the upper tip of the body 30.

The seat 40 carries a central sensor 42, for example of the electromagnetic type, detecting the axial position of a shaft 44 linked to the piston 32.

In the embodiment shown, the piston 32 is of a tubular cylindrical shape having a closed lower end and an open upper end, the shaft 44 extending inside the piston 32 and being pushed against the bottom of the piston by a bias spring 46 which bears at its lower end on the edge 48 of the lower end of the shaft 44 and which bears on its upper end on the seat 40 securely mounted on the upper end of the body 30, the spring 46 being used like the spring 36 to bias the piston 32 to its lower position against the seat 34.

The first pressurization threshold is defined by applying fuel pressure at the inlet of the pump 10 inside the body 30, such pressure being applied by at least one orifice 50 formed in the part of the body 30 which is found above the piston 32 so that the pressure PB is able to act on the piston 32, whatever the position of the latter, in order to push it downwards.

The second pressurization threshold is defined by applying fuel pressure PH at the outlet of the pump 10 on the piston 32, by means of an orifice 52 formed in the body 30 at a level lower than that of the orifice 50, in order that such orifice 52 may be sealed off by the piston 32 when the latter is in its lower position, and open again when the piston 32 is moved upwards by the fuel pressure P at the outlet of the flow rate control means 16, the fuel pressure PH thus acting on the piston 32 in order to push it downwards, such pressure P being determined by the pressure inside the feed pipe 22 of the injectors, by the pressure inside the body 30 and by the fuel flow rate supplied to the injectors.

More precisely, the orifice 52 comprises a cylindrical passage 54, which opens on the outside of the body 30 and whose length is lower than the thickness of the body 30 at this point, an annular groove 56, which is formed in the internal cylindrical surface of the body 30 at the level of the passage 54, and a hole 58 having a very slight diameter, which is formed in the thickness of the material separating the passage 54 from the annular groove 56 and which makes them communicate with each other.

The cylindrical wall of the piston 32 comprises at least one, and preferably several, radial orifices 60, located in a same transversal plane and spaced out around the axis of the piston, which are formed in an annular groove of the external peripheral surface of the piston and which are adapted to be brought to the level of the annular groove 56 of the body 30 when the piston is moved upwards by the fuel pressure P applied to the lower end of the body 30.

As seen in FIG. 3, when the piston 32 is in its lower injector 18 feed pipe 22 closure position, the annular groove of the piston 32, in which the radial orifices 60 are formed, is at a small axial distance from the annular groove 56 of the internal surface of the body 30.

Such axial distance defines the length of the first pressurization threshold.

The level of the second pressurization threshold is defined by the diameter of the hole 58 and the injected fuel flow rate value, for which the transition is produced between the two pressurization thresholds, is determined by the axial position of the hole 58 in the body 30.

The invention enables to define two fuel pressurization thresholds, one for start-up and restarting, the other as from the engine's idle speed upon making a simple and low-cost modification of the pressurization and cut-off valve.

The invention claimed is:
1. A fuel injection device in a turbomachine, comprising:
at least one pump connecting a fuel tank to flow rate control means supplying fuel injectors through the intermediary of a pressurization and cut-off valve, said valve comprising a piston that can be moved inside a cylindrical body between a closed position and an open position for feeding the injectors, means for applying the fuel pressure at the flow rate control means to the piston for closing the injector supply as long as said fuel pressure is lower than a first predetermined threshold, and means for applying a counter-pressure on the piston for closing the injector supply, as from the idle speed of the turbomachine, thereby creating a second pressurization threshold, such second threshold exceeding the first threshold and a minimal pressure value for controlling equipment with variable geometry of the turbomachine, wherein the cylindrical body of the valve comprises an orifice connected to the inlet of the pump, this orifice being axially spaced away from the means for applying the counter-pressure defining the second pressurization threshold, in order to permanently apply a pressure at the pump inlet on the piston and to define the first pressurization threshold.

2. A device according to claim 1, wherein the means for applying counter-pressure comprises an admission orifice formed in the cylindrical body of the valve and through which passes pressure from the outlet of the pump, this admission orifice being sealed off by the piston in its closed injector-feeding position and being open again by moving the piston as from the idle speed of the turbomachine.

3. A device according to claim 2, wherein the displacement distance of the piston between its closed injector feeding position and the opening of the admission orifice of the cylindrical body determines the flow rate of the injected fuel for which is performed the transition from the first pressurization threshold to the second threshold.

4. A device according to claim 2, wherein the diameter of the admission orifice of the counter-pressure inside the cylindrical body determines the value of the second pressurization threshold.

5. A device according to claim 2, wherein the shape of the means for applying the counter-pressure on the piston determines the transition speed between the first and the second pressurization threshold.

6. A device according to claim 2, wherein the admission orifice formed in the cylindrical body comprises a hole of a determined diameter, which opens into an annular groove of the internal cylindrical surface of the cylindrical body.

7. A device according to claim 6, wherein the annular groove of the internal surface of the body is adapted to communicate with an annular groove of the external cylindrical surface of the piston, in which are formed radial orifices opening inside the piston.

8. A turbomachine comprising a fuel-injection device according to claim 1.

9. A turbomachine according to claim 8, wherein the turbomachine is an aeroplane turboreactor or a turbopropeller.

10. A device according to claim 1, wherein a lower position of the piston is defined by a seat mounted inside an open lower end of the cylindrical body of the valve, and wherein a first spring is mounted around the piston, a first end of the first spring abutting an external edge of an upper part of the piston and a second end of the first spring abutting a seat mounted on an upper tip of the cylindrical body.

11. A device according to claim 10, wherein a shaft extends inside the piston and is pushed against a bottom portion of the piston by a second spring, a first end of the second spring abutting an edge of a lower end of the shaft and a second end of the second spring abutting the seat mounted on the upper tip of the cylindrical body, and wherein the second spring is disposed coaxial with and inside of the first spring.

12. A device according to claim 7, wherein the admission orifice includes a cylindrical passage which opens on an outside of the cylindrical body of the valve, a length of the cylindrical passage being less than a thickness of the body at the axial position of the cylindrical passage, and wherein the annular groove of the internal surface of the body is formed at the axial position of the cylindrical passage.

* * * * *